United States Patent [19]

Chaudhry

[11] Patent Number: 5,790,363
[45] Date of Patent: Aug. 4, 1998

[54] ETHERNET OVERVOLTAGE/ OVERCURRENT PROTECTION SYSTEM

[75] Inventor: Nisar A. Chaudhry, West Babylon, N.Y.

[73] Assignee: TII Industries, Inc., Copiague, N.Y.

[21] Appl. No.: 984,593

[22] Filed: Dec. 3, 1997

[51] Int. Cl.[6] .................................................. H01C 7/12
[52] U.S. Cl. ........................... 361/119; 361/120; 361/104; 361/106
[58] Field of Search ........................... 361/119, 120, 361/91, 111, 56, 104, 106, 107–108; 379/412; 364/483

[56] References Cited

U.S. PATENT DOCUMENTS

| | | | |
|---|---|---|---|
| 4,586,104 | 4/1986 | Standler | 361/91 |
| 4,849,846 | 7/1989 | Hung et al. | 361/56 |
| 4,903,295 | 2/1990 | Shannon et al. | 379/437 |
| 4,964,160 | 10/1990 | Traube et al. | 379/412 |
| 5,416,663 | 5/1995 | Atkins | 361/119 |
| 5,539,820 | 7/1996 | Pistilli | 379/412 |
| 5,721,773 | 2/1998 | Debalko | 379/412 |

Primary Examiner—Jeffrey A. Gaffin
Assistant Examiner—Michael J. Sherry
Attorney, Agent, or Firm—Morgan & Finnegan

[57] ABSTRACT

An overvoltage/overcurrent protection system for Ethernet networks using unshielded twisted pair cabling, the system comprising two overvoltage/overcurrent protection circuits, one circuit for the twisted pair carrying incoming digital signals and one circuit for the twisted pair carrying outgoing digital signals.

7 Claims, 2 Drawing Sheets

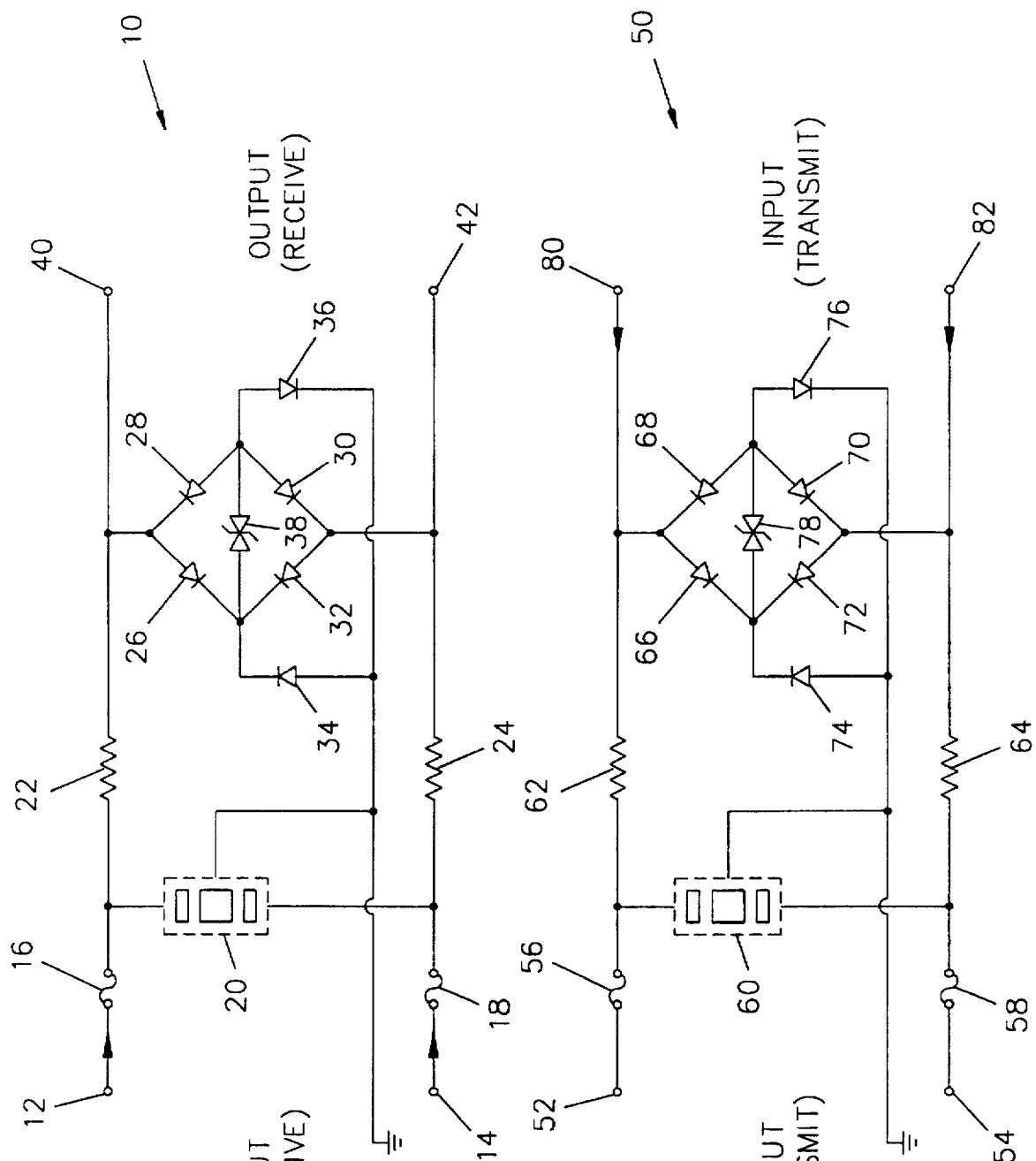

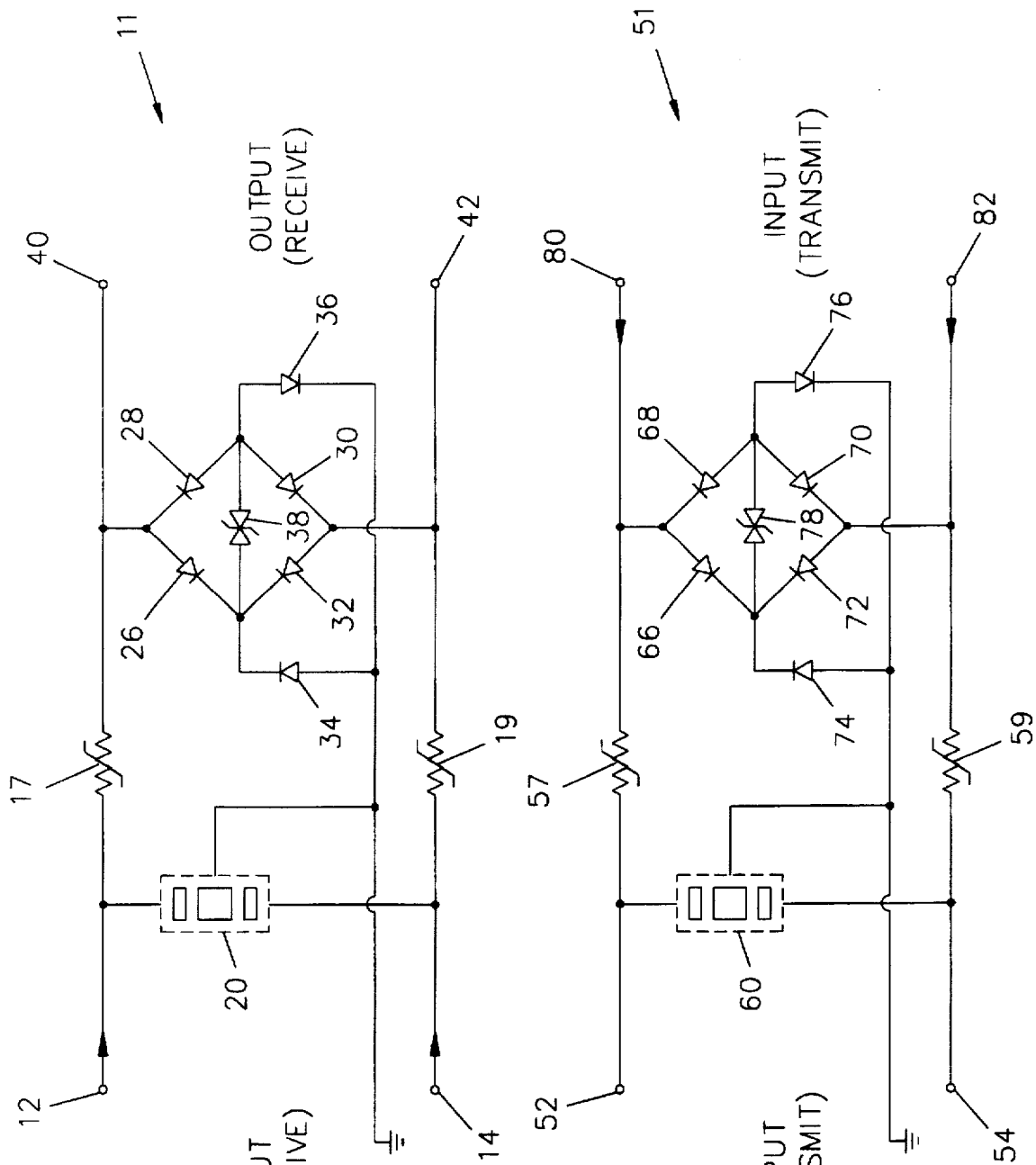
FIG. 2A INPUT (RECEIVE) / OUTPUT (RECEIVE)
FIG. 2B INPUT (TRANSMIT) / OUTPUT (TRANSMIT)

ETHERNET OVERVOLTAGE/ OVERCURRENT PROTECTION SYSTEM

BACKGROUND OF THE INVENTION

1. Field of the Invention

The present invention relates to an overvoltage/ overcurrent protection system for Ethernet networks which carry high speed digital signals.

2. Discussion of the Related Art

It is known in the prior art to protect telephone lines from overvoltage conditions. Telephone lines traditionally carry analog voice signals but can also carry relatively low speed digital signals. The same two telephone wires are used to carry both incoming and outgoing signals. Overvoltage protection for telephone lines has been provided by gas discharge tubes. Suitable gas discharge tubes are shown, for example, in U.S. Pat. No. 4,212,047 issued to John Napiorkowski on Jul. 8, 1980 and U.S. Pat. No. 4,319,300 issued to John Napiorkowski et al. on Mar. 9, 1982.

It is also known in the prior art to protect telephone lines from overvoltage and overcurrent conditions with solid state devices, with or without gas discharge tubes. For example, U.S. Pat. No. 5,359,657 issued to Dimitris J. Pelegris on Oct. 25, 1994 discloses protecting telephone lines with a solid state overvoltage/overcurrent protection circuit, while U.S. Pat. No. 4,586,104 issued to Ronald B. Standler on Apr. 29, 1996 discloses using both a gas discharge tube and a solid state device for protecting a communications line against overvoltage conditions.

Coaxial transmission lines have been used to carry signals requiring large bandwidth, such as analog video signals and very high speed digital signals. It is known in the prior art to protect coaxial transmission lines from overvoltage conditions using coaxial surge arrestors. One such coaxial surge arrestor is shown in U.S. Pat. No. 5,566,056 issued to Nisar A. Chaudhry on Oct. 15, 1996.

The June 1997 issue of Cabling Business contains an article entitled "Cabling For Ethernet (10 Mb), Fast Ethernet (100 Mb) And Gigabit Ethernet" (pages 74–75). It identifies IEEE specification 802.3i (also known as 10BASE-T) and IEEE specification 802.3u (also known as 100BASE-TX). The article states that 10BASE-T Ethernet networks handle 10 megabits per second (Mbps) while 100BASE-TX Fast Ethernet networks handle 100 Mbps.

Both 10BASE-T Ethernet and 100BASE-TX Fast Ethernet can be transmitted over unshielded twisted pair ("UTP") wires. One twisted pair is used for incoming digital signals and one twisted pair is used for outgoing digital signals. In addition, there are categories for classifying horizontal UTP cables and connecting hardware by performance capabilities. Thus, Category 3 encompasses UTP cables and connecting hardware with transmission characteristics up to 16 MHz, Category 4 encompasses UTP cables and connecting hardware with transmission characteristics up to 20 MHz and Category 5 encompasses cables and connecting hardware with transmission characteristics up to 100 MHz. 10BASE-T Ethernet (10 Mbs) can be implemented with Category 3, 4 or 5 cables and connecting hardware, whereas 100BASE-TX Fast Ethernet (100 Mbs) can be implemented with Category 5 cables and connecting hardware.

Overvoltage/overcurrent protection for high speed digital data lines is different from surge protection for standard voice telephone lines. Thus, surge protection for high speed digital data lines must have low capacitance and low insertion loss to avoid attenuating the high speed data signals. Moreover, the surge protection for the high speed data lines must protect against both high voltage surges and low voltage surges. Therefore, a need exists for an overvoltage protection system for 10BASE-T Ethernet and 100BASE-TX Fast Ethernet networks which does not significantly decrease the bandwidth of the networks.

The present invention fills that need by providing an overvoltage/overcurrent protection system for both 10BASE-T Ethernet and 100BASE-TX Fast Ethernet networks employing UTP cables and connecting hardware. The system of the present invention comprises two overvoltage/ overcurrent protection circuits, one circuit being connected in series with the twisted pair carrying incoming digital signals and the other circuit being connected in series with the twisted pair carrying outgoing digital signals. Each circuit provides overcurrent protection as well as primary and secondary overvoltage protection. The present invention provides overvoltage/overcurrent protection for 10BASE-T Ethernet and 100BASE-TX Fast Ethernet networks without significantly decreasing the bandwidth of the networks.

SUMMARY OF THE INVENTION

An overvoltage/overcurrent protection system for 10BASE-T Ethernet and 100BASE-TX Fast Ethernet networks according to the principles of the present invention comprises two overvoltage/overcurrent protection circuits, one circuit connected in series with the unshielded twisted pair carrying the incoming digital signals and the other circuit connected in series with the unshielded twisted pair carrying the outgoing digital signals. Each circuit contains overcurrent protection as well as primary and secondary overvoltage protection. The primary overvoltage protection is provided by a gas discharge tube while the secondary overvoltage protection is provided by a diode bridge with an avalanche diode connected across the diode bridge. One embodiment of the invention employs fuses for overcurrent protection. Another embodiment employs positive temperature coefficient resistors (PTCRs) for overcurrent protection.

The subject matter which I regard as my invention is particularly pointed out in the claims at the end of the specification. My invention, including its method of operation and its numerous advantages, may best be understood by reference to the following description taken in connection with the accompanying drawings wherein like reference characters refer to like components.

BRIEF DESCRIPTION OF THE DRAWINGS

FIG. 1A is a schematic diagram of a first overvoltage/ overcurrent protection circuit in accordance with a first embodiment of the invention, the circuit being adapted to be connected in series with a twisted pair of wires carrying incoming digital signals in a 10BASE-T Ethernet or 100BASE-TX Fast Ethernet network.

FIG. 1B is a schematic diagram of a second overvoltage/ overcurrent protection circuit in accordance with the first embodiment of the invention, the circuit being adapted to be connected in series with a twisted pair of wires carrying outgoing digital signals in a 10BASE-T Ethernet or 100BASE-TX Fast Ethernet network.

FIG. 2A is a schematic diagram of a first overvoltage/ overcurrent protection circuit in accordance with a second embodiment of the invention, the circuit being adapted to be connected in series with a twisted pair of wires carrying incoming digital signals in a 10BASE-T Ethernet or 100BASE-TX Fast Ethernet network.

FIG. 2B is a schematic diagram of a second overvoltage/ overcurrent protection circuit in accordance with the second embodiment of the invention, the circuit being adapted to be connected in series with a twisted pair of wires carrying outgoing digital signals in a 10BASE-T Ethernet or 100BASE-TX Fast Ethernet network.

DETAILED DESCRIPTION OF THE PREFERRED EMBODIMENTS

FIG. 1A is a schematic diagram of a first overvoltage/overcurrent protection circuit 10 in accordance with a first embodiment of the invention. Circuit 10 is adapted to be connected in series with a twisted pair of wires (a) in Category 3, 4 or 5 cabling carrying incoming digital signals in a 10BASE-T Ethernet network or (b) in Category 5 cabling carrying incoming digital signals in a 100BASE-TX Fast Ethernet network. Circuit 10 has an input (receive) side and an output (receive) side. The input side is adapted to be connected to a source of digital signals at terminals 12 and 14. The source may, for example, be the output from an optical network unit (ONU), a computer, a local area network (LAN) or a wide area network (WAN). The output side of circuit 10 may, for example, be connected to a computer or a LAN at terminals 40 and 42. One or more servers and one or more personal computers (PCs) may be connected to the LAN.

Circuit 10 provides both primary and secondary overvoltage protection as well as overcurrent protection. The overcurrent protection is provided by fuses 16 and 18 which are connected in series with the twisted pair of wires which carry the incoming digital signals. Fuses 16 and 18 are preferably less than one amp and may be ¾ amp Littlefuse type fuses. The primary overvoltage protection section comprises three-electrode gas discharge tube 20 which is connected across the twisted pair of wires which carry the incoming digital signals. Gas discharge tube 20 conducts when the voltage on either of the twisted wires exceeds a threshold value. The breakdown voltage may be between about 150 and about 300 volts, with a breakdown voltage of on the order of 250 volts being preferred. A suitable three-electrode gas discharge tube is shown in Napiorkowski, U.S. Pat. No. 4,212,047. Suitable three-electrode gas discharge tubes are also available from TII Industries, Inc., Copiague, N.Y. as TII 71 type or 73/75 type with a voltage breakdown range of 150–300 VDC.

As will be understood by persons skilled in the art, two two-electrode gas discharge tubes may be used in lieu of a single three electrode gas discharge tube and using two two-electrode gas discharge tubes is the full equivalent of using one three-electrode gas discharge tube. In the present invention three-electrode gas discharge tubes are preferred to two-electrode gas discharge tubes and, therefore, three-electrode gas discharge tubes are shown in the drawings.

The secondary overvoltage protection section of circuit 10 comprises diodes 26 through 36 and avalanche diode 38. Diodes 26 through 32 form a diode bridge and avalanche diode 38 is connected across the diode bridge. The diode bridge is connected across the twisted pair of wires which carry the incoming digital signals and limits the voltage on those wires in the event that the voltage substantially exceeds, for example, the normal digital signal levels. Typical digital signal levels are plus or minus five volts. Diodes 26 through 30 may be type IN4007, 1 amp, 1000 volt PIV diodes. Diodes 34 and 36 may be type RL204G, 2 amp, 1000 volt PIV diodes. Diode 38 may be a type 1.5KE12, 12 volt avalanche diode. Alternatively, diode 38 may be two series-connected low capacitance, 6 volt 1500 watt diodes made by Samtech of 650 Mitchell Road, Newbury Park, Calif. 91320 and sold under part number LC01-6.

Using two avalanche diodes connected in series provides two benefits: (1) the surge energy handling capability of the protector doubles and (2) the capacitance offered to the diode bridge is halved. Two avalanche diodes connected in parallel could also double the surge handling capability, but diodes do not have the same breakdown voltage, and therefore do not share energy equally. Moreover, using two avalanche diodes connected in parallel causes the capacitance to the diode bridge to double, which could significantly attenuate the digital signal.

Excessive positive voltages appearing at terminal 40 are clamped by diodes 26 and 36 and avalanche diode 38. Excessive negative voltages appearing at terminal 40 are clamped by diodes 28 and 34 and avalanche diode 38. Excessive positive voltages appearing on terminal 42 are clamped by diodes 32 and 36 and avalanche diode 38. Excessive negative voltages appearing at terminal 42 are clamped by diodes 30 and 34 and avalanche diode 38. If diode 38 is a 12 volt avalanche diode, then voltages exceeding about plus or minus 15 volts would be clamped by the secondary protection circuit. If diode 38 is two series-connected 12 volt avalanche diodes, then voltages exceeding about 35 volts would be clamped by the secondary protection circuit. Avalanche diodes are available with many different breakdown voltages and the clamping voltage may be chosen by selecting suitable avalanche diodes.

Resistors 22 and 24 isolate the primary and secondary overvoltage protection sections and also limit the current which can flow through overvoltage protection circuit 10. Resistors 22 and 24 may be between about 5 and about 6 ohms and are preferably 5.6 ohms, ½ watt.

FIG. 1B shows a second overvoltage/overcurrent protection circuit 50 in accordance with the first embodiment of the invention. Circuit 50 is adapted to be connected in series with a twisted pair of wires (a) in Category 3, 4 or 5 cabling carrying outgoing digital signals in a 10BASE-T Ethernet network or (b) in Category 5 cabling carrying outgoing digital signals in 100BASE-TX Fast Ethernet network. Circuit 50 has an input (transmit) side and an output (transmit) side. Terminals 80 and 82 may be connected, for example, to a LAN, while terminals 52 and 54 may be connected, for example, to an ONU, a computer, a WAN or another LAN.

Circuit 50 provides both primary overvoltage protection and secondary overvoltage protection as well as overcurrent protection. Overcurrent protection is provided by fuses 56 and 58. The primary overvoltage protection section comprises three-electrode gas discharge tube 60, while the secondary overvoltage protection section comprises diodes 66 through 76 and avalanche diode 78. Circuit 50 also comprises resistors 62 and 64 which isolate the primary and secondary overvoltage protection sections and also limit the current which can flow through circuit 50.

The description of the components in circuit 10 and their operation applies to like components in circuit 50. The combination of circuit 10 (for incoming digital signals) and circuit 50 (for outgoing digital signals) comprise one embodiment of the overvoltage protection system of the present invention for protecting 10BASE-T Ethernet and 100BASE-TX Fast Ethernet networks.

FIG. 2A shows a schematic diagram of a first overvoltage/overcurrent protection circuit 11 in accordance with a second embodiment of the invention. Circuit 11 is adapted to be connected in-series with a twisted pair of wires (a) in Category 3, 4 or 5 cabling carrying incoming digital signals in a 10BASE-T network or (b) in Category 5 cabling carrying incoming digital signals in a 100BASE-TX Fast Ethernet network. Circuit 11 has an input (receive) side and an output (receive) side. The input side is adapted to be connected to a source of digital data signals at terminals 12 and 14. As with circuit 10 in FIG. 1A, the source may, for example, be an ONU, a computer, a LAN or a WAN. The output side of circuit 11, may, for example, be connected to a computer or a LAN and the LAN may have connected to it one or more servers and one or more PCs.

Circuit 11 provides both primary and secondary overvoltage protection as well as overcurrent protection. The overcurrent protection is provided by positive temperature coefficient resistors (PTCRs) 17 and 19 which limit the current flowing through circuit 11. As current flows through the PTCRs, the temperature increases and, as the temperature increases, the resistance increases, thereby reducing the current flow. PTCRs 17 and 19 may be type TR600-150 which are available from Raychem Corp., Menlo Park, Calif. The primary overvoltage protection section comprises gas discharge tube 20 which is connected across the wires carrying the incoming digital signals. The operation of gas discharge tube 20 in circuit 11 is the same as in circuit 10. The secondary overvoltage protection section of circuit 11 is the same as the secondary overvoltage protection section of circuit 10 and operates the same way.

FIG. 2B shows a second overvoltage/overcurrent protection circuit 51 in accordance with the second embodiment of invention. Circuit 51 is adapted to be connected in series with the twisted pair of wires (a) in Category 3, 4 or 5 cabling carrying outgoing digital signals in a 10BASE-T Ethernet network or (b) in Category 5 cabling carrying outgoing digital signals in a 100BASE-TX Fast Ethernet network. Circuit 51 has an input (transmit) side and an output (transmit) side. Terminals 80 and 82 may be connected, for example, to a LAN, while terminals 52 and 54 may be connected, for example, to an ONU, a computer, a WAN or another LAN.

Circuit 51 provides both primary and secondary overvoltage protection as well as overcurrent protection. Overcurrent protection is provided by PTCRs 57 and 59. The primary overvoltage protection section comprises three-electrode gas discharge tube 60, while the secondary overvoltage protection section comprises diodes 66 through 76 and avalanche diode 78. PTCRs 57 and 59 function like PTCRs 17 and 19 and limit the current which can flow through circuit 51. The combination of circuit 11 (for incoming digital signals) and circuit 51 (for outgoing digital signals) comprise a second embodiment of the overvoltage/overcurrent protection system of the present invention for protecting 10BASE-T Ethernet and 100BASE-TX Fast Ethernet networks.

It will be understood that various changes in the details, materials, arrangement of parts and operating conditions which have been herein described and illustrated in order to explain the nature of the invention may be made by those skilled in the art without departing from the principles and scope of the instant invention.

What is claimed is:

1. An overvoltage/overcurrent protection system for Ethernet networks using unshielded twisted pair cabling comprising:

(a) a first overvoltage/overcurrent protection circuit adapted to be connected in series with first and second twisted wires carrying incoming digital signals, the first circuit comprising a primary overvoltage protection section, a secondary overvoltage protection section and an overcurrent protection section, (1) the overcurrent protection section of the first circuit comprising first and second fuses, the first side of the first fuse for being connected to the first twisted wire and the first side of the second fuse for being connected to the second twisted wire, (2) the primary overvoltage protection section of the first circuit comprising a first three-electrode gas discharge tube, the first electrode being connected to the second side of the first fuse, the second electrode being connected to the second side of the second fuse, and the third electrode for being connected to ground, (3) first and second resistors, the first side of the first resistor being connected to the second side of the first fuse and the first electrode of the first gas discharge tube, and the first side of the second resistor being connected to the second side of the second fuse and the second electrode of the first gas discharge tube, (4) the secondary overvoltage protection section of the first circuit comprising a diode bridge comprising first, second, third, fourth, fifth and sixth diodes and a first avalanche diode, the anode of the first diode being connected to the cathode of the second diode and to the second side of the first resistor, the cathode of the third diode being connected to the anode of the fourth diode and to the second side of the second resistor, the cathode of the first diode being connected to the cathode of the fourth diode, to the first side of the first avalanche diode and to the cathode of the fifth diode, the anode of the second diode being connected to the anode of the third diode, the second side of the first avalanche diode and the anode of the sixth diode, the anode of the fifth diode and the cathode of the sixth diode for being connected to ground; and (b) a second overvoltage/overcurrent protection circuit adapted to be connected in series with third and fourth twisted wires carrying outgoing digital signals, the second circuit comprising a primary overvoltage protection section, a secondary overvoltage protection section and an overcurrent protection section, (1) the overcurrent protection section of the second circuit comprising third and fourth fuses, the first side of the third fuse for being connected to the third twisted wire and the first side of the fourth fuse for being connected to the fourth twisted wire, (2) the primary overvoltage protection section of the second circuit comprising a second three-electrode gas discharge tube, the first electrode being connected to the second side of the third fuse, the second electrode being connected to the second side of the fourth fuse and the third electrode for being connected to ground, (3) third and fourth resistors, the first side of the third resistor being connected to the second side of the third fuse and to the first electrode of the second gas discharge tube, and the first side of the fourth resistor being connected to the second side of the fourth fuse and to the second electrode of the second gas discharge tube, (4) the secondary overvoltage protection section of the second circuit comprising a diode bridge comprising seventh, eighth, ninth, tenth, eleventh and twelfth diodes and a second avalanche diode, the anode of the seventh diode being connected to the cathode of the eighth diode and to the second side of the third resistor, the cathode of the ninth diode being connected to the anode of the tenth diode and to the second side of the fourth resistor, the cathode of the seventh diode being connected to the cathode of the tenth diode, to the first side of the second avalanche diode and to the cathode of the eleventh diode, the anode of the eighth diode being connected to the anode of the ninth diode, the second side of the second avalanche diode and the anode of the twelfth diode, the anode of the eleventh diode, and the cathode of the twelfth diode for being connected to ground.

2. An overvoltage/overcurrent protection system for Ethernet networks using unshielded twisted pair cabling comprising:

(a) a first overvoltage/overcurrent protection circuit adapted to be connected in series with first and second twisted wires carrying incoming digital signals, the first circuit comprising a primary overvoltage protection section, a secondary overvoltage protection section and an overcurrent protection section, (1) the primary overvoltage protection section of the first circuit comprising a first three-electrode gas discharge tube, the first electrode for being connected to the first twisted wire, the second electrode for being connected to the second twisted wire and the third electrode for being connected to ground, (2) the overcurrent protection section of the first circuit comprising first and second positive temperature coefficient resistors (PTCRs), the first side of the first PTCR being connected to the first electrode of the first gas discharge tube and the first side of the second PTCR being connected to the second electrode of the first gas discharge tube, (3) the secondary overvoltage protection section of the first circuit comprising a diode bridge comprising first, second, third, fourth, fifth and sixth diodes and a first avalanche diode, the anode of the first diode being connected to the cathode of the second diode and to the second side of the first PTCR, the cathode of the third diode being connected to the anode of the fourth diode and to the second side of the second PTCR, the cathode of the first diode being connected to the cathode of the fourth diode, to the first side of the first avalanche diode and to the cathode of the fifth diode, the anode of the second diode being connected to the anode of the third diode, the second side of the first avalanche diode and the anode of the sixth diode, the anode of the fifth diode and the cathode of the sixth diode for being connected to ground; and (b) a second overvoltage/overcurrent protection circuit adapted to be connected in series with third and fourth twisted wires carrying outgoing digital signals, the second circuit comprising a primary overvoltage protection section, a secondary overvoltage protection section and an overcurrent protection section, (1) the primary overvoltage protection section of the second circuit comprising a second three-electrode gas discharge tube, the first electrode for being connected to the third twisted wire, the second electrode for being connected to the fourth twisted wire and the third electrode for being connected to ground, (2) the overcurrent protection section of the second circuit comprising third and fourth PTCRs, the first side of the third PTCR being connected to the first electrode of the second gas discharge tube and the first side of the fourth PTCR being connected to the second electrode of the second gas discharge tube, (3) the secondary overvoltage protection section of the second circuit comprising a diode bridge comprising seventh, eighth, ninth, tenth, eleventh and twelfth diodes and a second avalanche diode, the anode of the seventh diode being connected to the cathode of the eighth diode and to the second side of the third PCTR, the cathode of the ninth diode being connected to the anode of the tenth diode and to the second side of the fourth PTCR, the cathode of the seventh diode being connected to the cathode of the tenth diode, to the first side of the second avalanche diode and to the cathode of the eleventh diode, the anode of the eighth diode being connected to the anode of the ninth diode, the second side of the second avalanche diode and the anode of the twelfth diode, the anode of the eleventh diode and the cathode of the twelfth diode for being connected to ground.

3. An overvoltage/overcurrent protection system according to claim 1 wherein the first, second, third and fourth fuses are less than one ampere.

4. An overvoltage/overcurrent protection system according to claim 1 wherein at least one of the first, second, third and fourth resistors is between about 5 and about 6 ohms.

5. An overvoltage/overcurrent protection system according to claim 1 or claim 2 wherein at least one of the first and second gas discharge tubes has a breakdown voltage between 150 and 300 VDC.

6. An overvoltage/overcurrent protection system according to claim 1 or claim 2 wherein the secondary overvoltage protection circuit clamps voltages in excess of about 15 volts.

7. An overvoltage protection system according to claim 1 or claim 2 wherein the secondary overvoltage protection circuit clamps voltages in excess of about 35 volts.

* * * * *